United States Patent

Heyworth

[11] Patent Number: 6,089,431
[45] Date of Patent: Jul. 18, 2000

[54] HOIST APPARATUS

[76] Inventor: Malcolm Edward Heyworth, 9214 Belmont La., Waxhall, N.C. 28173

[21] Appl. No.: 09/272,948

[22] Filed: Mar. 19, 1999

Related U.S. Application Data

[60] Provisional application No. 60/078,632, Mar. 19, 1998.

[51] Int. Cl.$^7$ .................................. B60D 1/14; B60R 9/06
[52] U.S. Cl. ...................... 224/521; 280/497; 414/462; 414/543
[58] Field of Search .......................... 280/497; 224/519, 224/521; 414/543, 462

[56] References Cited

U.S. PATENT DOCUMENTS

| | | | |
|---|---|---|---|
| 2,772,799 | 12/1956 | Bridinger | 224/519 |
| 3,215,294 | 11/1965 | Salamin | 414/462 |
| 3,519,154 | 7/1970 | Riley | 414/462 |
| 4,046,398 | 9/1977 | Dunwoody | 280/497 X |
| 4,226,331 | 10/1980 | Dumond | 212/258 |
| 4,381,069 | 4/1983 | Kreck | 224/502 |
| 4,397,607 | 8/1983 | Neill, Jr. et al. | 414/800 |
| 4,419,038 | 12/1983 | Pendergraft | 414/543 |
| 4,561,575 | 12/1985 | Jones | 224/42.21 |
| 4,676,413 | 6/1987 | Began et al. | 224/532 |
| 4,746,263 | 5/1988 | Cook | 414/543 |
| 4,806,063 | 2/1989 | York | 414/462 |
| 4,881,864 | 11/1989 | Amato | 414/543 |
| 4,961,604 | 10/1990 | Kisner | 293/106 |
| 4,971,509 | 11/1990 | Sechovec et al. | 414/462 |
| 4,997,152 | 3/1991 | Wagman et al. | 248/168 |
| 5,064,078 | 11/1991 | Van Staveren | 212/180 |
| 5,100,283 | 3/1992 | Carty | 414/590 |
| 5,137,411 | 8/1992 | Eul et al. | 414/462 |
| 5,205,700 | 4/1993 | Lin et al. | 414/540 |
| 5,211,526 | 5/1993 | Robinette | 414/550 |
| 5,281,078 | 1/1994 | Mills, Jr. | 414/680 |
| 5,417,609 | 5/1995 | Oldham | 452/187 |
| 5,540,537 | 7/1996 | Welch | 414/462 |
| 5,562,534 | 10/1996 | McGough | 452/187 |
| 5,588,907 | 12/1996 | DePietro et al. | 452/187 |
| 5,591,077 | 1/1997 | Rowe | 452/189 |
| 5,662,451 | 9/1997 | Muzzi et al. | 414/540 |
| 5,752,799 | 5/1998 | Carey et al. | 414/462 X |
| 5,791,858 | 8/1998 | Sasser | 414/462 |
| 5,810,542 | 9/1998 | Ostrander | 414/462 |
| 5,884,930 | 3/1999 | Cluth | 280/497 |

*Primary Examiner*—Janice L. Krizek
*Attorney, Agent, or Firm*—Kilpatrick Stockton LLP; James J. Bindseil

[57] ABSTRACT

A hoist for lifting game animals or other loads comprises a boom mounted on a support column in communication with a base. The boom is rotatable relative to the base, which is insertable within a draw bar-type hitch receiver. The boom, support column and base are modular components that advantageously allow for quick assembly/disassembly of the hoist and compact storage of the hoist components. Further, the length of the hoist is adjustable to compensate for the size of the game animal or load being lifted. Additionally, a light source is attached to the hoist to illuminate the area near the hoist to increase safety during operation of the hoist. Finally, a dual draw bar for increasing the utilization of a draw bar-type hitch is included. The dual draw bar has at one end a draw bar adapter and at the opposite end a first and a second receiver section for utilization with draw bar-type accessories.

11 Claims, 8 Drawing Sheets

HOIST APPARATUS

CROSS-REFERENCE TO RELATED APPLICATIONS

This application claims the benefit of U.S. Provisional Application No. 60/078,632, filed Mar. 19, 1998.

FIELD OF THE INVENTION

The invention relates generally to a hoist, and more particularly, to a modular hoist utilized with a draw bar-type hitch receiver.

BACKGROUND OF THE INVENTION

Hunting has become a very popular sport in the past few years. The number of participants has not only increased, but also diversified. Women, young adults and even supervised children have started hunting. The old pickup truck used to be the only vehicle utilized by the hunter. With the introduction of sport utility vehicles and even four-wheel drive cars, however, the need to ease common problems with hunting game animals is very high. Currently, a large tree, gambrel and block and tackle are needed in order to dress a bagged game animal if dressing facilities are not available. Normally, the car, sport utility vehicle or pickup cannot be driven to the nearest tree without some risks involved. Such risks include getting stuck, damaging the vehicle, land or crops. Therefore, not only does the game animal have to be packed to the dressing location, but the required game-dressing equipment, including coolers for transporting the game, also must be packed from the vehicle to this location.

Additionally, some current game hoists cannot aid in transferring the game animal from one location to another. Typical game hoists are limited to lifting or lowering the game animal over the same location. For example, this limitation makes it awkward and difficult to transfer the game animal from the dressing location to a vehicle or trailer that is utilized to transport the game animal.

Similarly, some current game hoists are problematic because they are a fixed length. The fixed length of current game hoists requires a large vehicle or trailer to accommodate the entire span of the game hoist. This presents problems in packing and transporting such game hoists. Also, fixed length game hoists are difficult to set up and utilize, as they tend to be very heavy and cumbersome. Finally, fixed length game hoists do not have the ability to compensate for the size of the game animal, leading to difficulty in handling and dressing the game animal as it is suspended from the game hoist.

Further, the dressing of a game animal frequently takes place in the dark. If an animal is taken in the morning or midday hours, the hunter will usually continue to hunt until dark to get in a full day of hunting due to time constraints. Since many hunters only have the availability to hunt on weekends, these hunters attempt to maximize their hunting time during the daylight hours of the weekend. As such, a weekend hunter's daylight time in the woods is precious. The result is that a game animal taken in daylight hours is often left to be dressed in the hours of dusk or darkness. In these dark conditions the ease and safety of dressing the game animal is reduced, as sharp dressing tools are being utilized under conditions of limited sight. Thus, there is a need to improve upon these conditions.

Additionally, the vehicles used by the hunter typically have a draw bar-type hitch receiver. These draw bar-type hitch receivers used on trucks, sport utility vehicles or cars provide the owner with the limited utility of attaching a trailer to the vehicle. Usually there are other accessories that are used along with the trailed item, however, and often it is inconvenient or impossible for these accessories to be stored in the vehicle or with the trailered item. Further, current draw bar-type hitch receivers are limited by only providing use for a single trailer hitch. The draw bar-type hitch receiver may be utilized for other accessories, but this requires the trailered item to be disconnected. This leads to problems with moving and storing the trailered item, as well as leading to problems in moving the game animal. Thus, there is a need for increasing the number of uses of a draw bar-type hitch receiver.

SUMMARY OF THE INVENTION

Accordingly, the present invention provides a reasonably-priced, modular hoist for use with any draw bar-type receiver hitch. The hoist is the relatively easy to assemble, disassemble, pack and is compactly stowed. The hoist for lifting a game animal or other load comprises a base adapted for adjustable insertion within a draw bar-type hitch receiver, a support column having an end in removable communication with the base, and a boom in removable communication with the support column. The boom is rotatable relative to the base to enable the game animal or load to be easily transferred to any area adjacent to the hoist. Also, the hoist has an adjustable length to compensate for the size of the game animal or load. The length of the hoist may be changed by adjusting the removable, fixed positioning of each of the hoist components relative to the adjacent component. Additionally, support column may comprise a first support member removably adjustable within a second support member to further provide modularity and to enable changing the length of the hoist. Further, by including a base that is directly insertable in any draw bar-type hitch receiver, the present invention not only adds safety to the cleaning of game with the assistance of a hoist, but also adds the convenience of being at the vehicle's location.

Another feature of the present invention is a light source removably attachable to the hoist. The light source is battery-operated or plugged into the vehicle's trailer lights. The light source insures additional safety while using sharp dressing objects, illuminating the game animal and the areas adjacent to the hoist.

In accordance with another feature of the present invention, a dual draw bar for use with a draw bar-type hitch receiver is disclosed. The dual draw bar is attached at one end to a vehicle draw bar-type hitch receiver and at the other end has a first and second receiver for attachment to trailered items or accessories. The distance between the first receiver is adjustable relative to the second receiver with a multiple hole and pin locking mechanism, for example. The dual draw bar advantageously allows a draw bar-type hitch receiver to be combined with numerous other accessories to more efficiently utilize the capabilities of the hitch receiver.

DETAILED DESCRIPTION OF THE INVENTION

Figure 1:
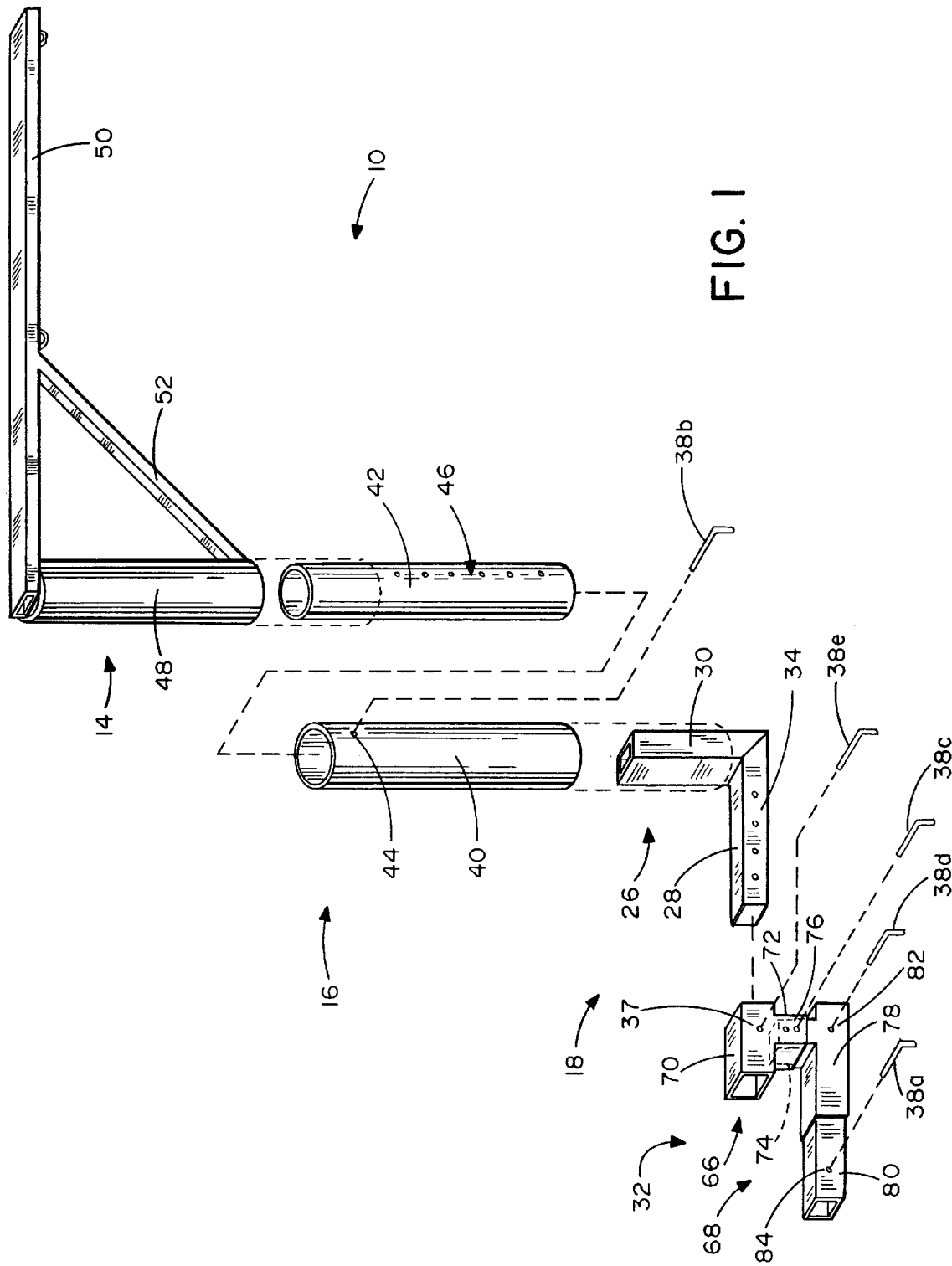
FIG. 1 is an exploded perspective view of the components of one embodiment of a hoist of the present invention.
Figure 2:
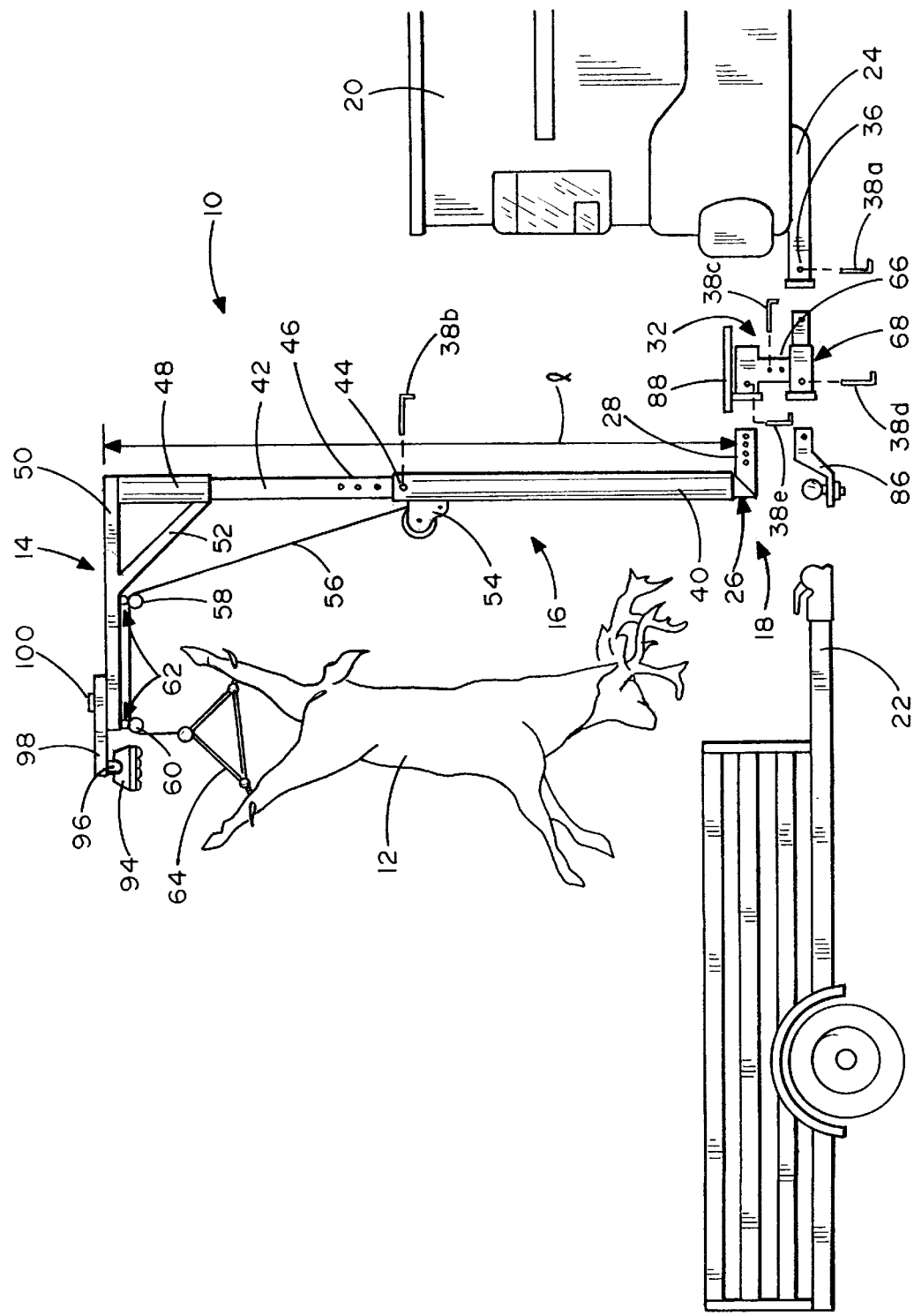
FIG. 2 is a side elevational view of the hoist of the present invention with an affixed winch, the hoist being positioned within a dual draw bar attached to a vehicle and a trailer.

According to the present invention, referring to FIGS. 1 and 2, one embodiment of a modular hoist 10 for lifting and moving a game animal 12 for cleaning and dressing, comprises a swiveling boom 14 removably attached to a support column 16 that is similarly removably attached to a base 18. Boom 14 is rotatable relative to base 18 such that a game animal 12 or another load supported by hoist 10 may be easily moved from the ground to a vehicle 20 or trailer 22, for example, adjacent to the hoist. The components of hoist 10 are advantageously modular, thereby allowing for quick and easy assembly and disassembly. Further, the modular design of hoist 10 beneficially allows for compact storage of the hoist. Additionally, the position of the components of hoist 10 are adjustable relative to each other to provide an adjustable length, l, of boom 14 relative to base 18. When hoist 10 is disposed perpendicular to the ground, the adjustable length l of hoist 10 allows the height of the hoist to be easily adjusted to compensate for the size of game animal 12 being dressed. Finally, base 18 is adjustably positionable within a draw bar-type hitch receiver 24 that may be affixed to vehicle 20, for example. As such, packing game animal 12 over long distances may be avoided as hoist 10 may be utilized at the location of the game animal by assembling the hoist directly into draw bar-type hitch receiver 24, such as on vehicle 20 that may be driven to the location. Thus, one embodiment of the present invention comprises an adjustable height, modular, swiveling hoist 10 that is sized to mount within draw bar-type hitch receiver 24 for the convenient dressing and cleaning of game animal 12 and for easy assembly/disassembly and compact storage.

Base 18 preferably comprises base support member 26 having a draw bar portion 28 for insertion within draw bar-type hitch receiver 24 and a base column 30 in communication with support column 16. Base 18 may additionally comprise a dual draw bar 32, as will be discussed in detail below. Base support member 26 preferably comprises hollow, rectangular metal tubing. As one skilled in the art will realize, however, base support member 26 may be constructed from other materials having the strength to support the load of hoist 10 and may have other configurations allowing insertion within draw bar-type hitch receiver 24 and communication with support column 16. Draw bar portion 28 and base column 30 may be formed as one piece, or they may be separate pieces that are fixedly attached, such as by welding or other similar methods. Base support member 26 may be an L-shaped member, such that draw bar portion 28 is preferably a substantially horizontal section of base support member 26, while base column 30 forms an adjacent, substantially vertical section. Base support member 26 may take other shapes, however, like an inverted T-shape, such that base 18 positions boom 14 for properly lifting a load.

Draw bar portion 28 further comprises a plurality of apertures 34, one of which is aligned with aperture 36 of draw bar-type hitch receiver 24 (FIG. 2) or with aperture 37 of dual draw bar 32 (FIG. 1). The alignment of apertures 34 and 36 or 37 allows the adjustable attachment of the draw bar portion to the draw bar-type hitch receiver with the use of securing mechanism 38a or 38e, such as a pin, latching pin, bolt, or other similar device. The size of the external cross-section of draw bar portion 28 is preferably smaller than the size of the internal cross-section of a draw bar-type hitch receiver to allow the insertion of the draw bar portion within the draw bar-type hitch receiver. Yet, the size of the external cross-section of draw bar portion 28 is large enough to prevent the rotation of the draw bar portion within the draw bar-type hitch receiver. Draw bar portion 28 advantageously allows hoist 10 to be utilized with vehicle 20 or other object having a draw bar-type hitch receiver. When used with vehicle 20, hoist 10 thus allows a cellular or digital phone that is mounted or stored in the vehicle to be conveniently used to call in and report the game to the proper authorities, as is typically required by law, prior to dressing game animal 12.

Similarly, base column 30 is sized for removable communication with support column 16. Preferably, base column 30 has a square cross-section that fits inside support column 16, which has a round, tubular cross-section, thereby allowing rotation of the support column relative to the base column. As one skilled in the art will realize, however, there are numerous combinations of shapes for base column 30 and support column 16 that allow relative rotation between the two columns. Other suitable examples include: a round support column inside a square, tubular base column; a round base column inside a square, tubular support column; as well as other triangular, t-shaped, L-shaped, etc. cross-sections inside round, tubular cross-sections. Alternatively, base column 30 and support column 16 may be in fixed, removable communication, such as by pinning, bolting, slotting or using some other similar method to prevent the relative rotation of the two columns. In this alternate embodiment, the support column and the base column may have corresponding apertures that may allow for the adjustable positioning of the support column relative to the base column, thereby contributing to the adjustable length l of the hoist.

As mentioned above, support column 16 preferably rotates relative to base 18 and is also preferably adjustable in length. The adjustable length of support column 16 advantageously contributes to the adjustable length l of hoist 10, as well as providing for the compact storage of hoist 10. Support column 16 preferably comprises a first support member 40 in rotatable communication with base 18 and a second support member 42 in rotatable communication with boom 14. Second support member 42 telescopes within first support member 40 to provide support column 16 with an adjustable length. Second support member 42 is removably adjustable within first support member 40 by placing securing mechanism 38b through aperture 44 on the upper end of first support member and through one of the corresponding plurality of apertures 46 on the lower end of the second support member. The cross-sections of first and second support members 40 and 42 are sized to allow telescoping communication between the members while maintaining a substantially parallel positioning of the longitudinal axis of each member. Preferably, first and second support members 40 and 42 comprise round, hollow metal tube sections, where the external cross-section, or outer diameter, of the second support member is less than the internal cross-section, or inner diameter, of the first support member to allow the telescoping action of the members. As one skilled in the art will realize, however, there are many other shapes and configurations for support column 16 that would allow hoist 10 of the present invention to function as described herein. In an alternate embodiment, the second support member may comprise a second plurality of apertures at the upper end that communicate with an aperture at the lower end of the boom so as to allow the adjustable positioning of the boom relative to the support column by affixing a securing mechanism between the apertures.

Boom 14 preferably comprises a boom column 48 fixedly attached to a boom arm 50 that carries the weight of game animal 12 or another load. Boom arm 50 is supported by an angled brace 52 that extends to boom column 48, where the brace increases the load capacity of the boom arm. Boom column 48 is in rotatable communication with support column 16, and preferably with second support member 42. Preferably, boom arm 50 and brace 52 comprise metal sections, more preferably square or rectangular metal tube sections. Similarly, boom column 48 preferably comprises a hollow, round metal tube section sized such that the internal fit cross-section, or inner diameter, of the boom column is greater than the external cross-section, or outer diameter, of support column 16, preferably second support member 42. As one skilled in the art will realize, however, there are many other shapes and configurations for boom 14 that would allow hoist 10 of the present invention to function as described herein. Boom column 48 slides over second support member 42 until the upper end of the second support member contacts boom arm 50 which blocks of one end of the boom column. Alternatively, pins, blocks or other stopping mechanisms may be mounted inside or through boom column 48 to limit the depth of insertion of second support member 42 within the boom column. Thus, boom 14 is rotatable relative to base 18 to allow game animal 12 or another load to be swung into any desired area adjacent to hoist 10.

Additionally, boom column 48, support column 16 and base column 30 have substantially parallel longitudinal axes. The substantially parallel positioning of the longitudinal axes of boom column 48, support column 16 and base column 30 provide a substantially straight, vertical position for hoist 10 when the hoist is mounted in draw bar-type hitch receiver 24, perpendicular to the ground. Further, the substantially parallel positioning of the axes prevents the components of hoist 10 from becoming cockeyed and efficiently transfers the load on boom 14 to draw bar-type hitch receiver 24.

Hoist 10 additionally comprises a winch 54 having a rope or cable 56 that is fed through a first and second pulley 58 and 60 attached to boom arm 50 with attachment mechanism 62, such as hooks and eyelets. Alternatively, a cleat may be used instead of winch 54 to secure rope 56 to hoist 10. Winch 54 is preferably manually operated, but may be electrically operated through a connection to the electrical system of vehicle 20, a battery, or other similar connection. At the end of rope or cable 56 opposite from winch 54, various lift devices 64 may be attached to aid in securing game animal 12 or other types of loads. For example, lift device 64 such as a gambrel may be affixed to cable 56 such that game animal 12 may be lifted by hoist 10 for dressing and cleaning. Other suitable lift devices 64 for attachment to the end of cable 56 include hooks, bars, straps and other similar devices.

In another embodiment, as mentioned above, base 18 additionally comprises a dual draw bar 32 for utilization with draw bar-type hitch receiver 24 to increase the capabilities of the draw bar-type hitch receiver. Dual draw bar 32 connects base support member 26 to draw bar-type hitch receiver 24 through a first receiver 66, while having a second receiver 68 available for attachment to trailered items or other accessories. Dual draw bar 32 is made of universal conformities to adapt to and be used with any existing accessories available at this time for any draw bar-type hitch receiver. Thus, dual draw bar 32 advantageously increases the number of uses of a draw bar-type trailer hitch assembly by allowing two accessories to be used at one time with one draw bar-type hitch receiver.

Dual draw bar 32 has the shape of a lower case letter "h" lying on it's left side. First receiver 66 comprises a tubular first receiver section 70 sized to receive a typical draw bar, such as draw bar portion 28 of base support member 26. A first mating section 72 projects substantially perpendicularly from first receiver section 70 and communicates with a second mating section 74 projecting from second receiver 68. Preferably, first mating section 72 comprises a hollow tube having an internal cross-section greater than the external cross-section of second mating section 74, which also comprises a hollow tube. First mating section 72 additionally comprises a plurality of apertures 76 corresponding to an aperture (not shown) in second mating section 74 that allows the distance between the mating sections to be adjusted. A securing mechanism 38c disposed through the apertures removably fixes the relative distance between first and second receivers 66 and 68. The ability to adjust the distance between first and second receivers 66 and 68 advantageously allows clearance for tailgates or tire racks, for example.

Similarly, second receiver 68 comprises at one end a second receiver section 78 and at the opposite end a draw bar adapter 80. Second receiver section 78 is preferably tubular and is sized to receive a typical draw bar. As such, the internal cross-sectional dimension of second receiver section is greater than the external cross-sectional dimension of a typical draw bar. Conversely, draw bar adapter 80 is sized to fit within a hitch receiver, such as draw bar-type hitch receiver 24 of vehicle 20. Additionally, apertures 82 and 84 located on second receiver section 78 and draw bar adapter 80, respectively, align with corresponding apertures in the draw bar-type hitch receiver and in the draw bar such that securing mechanisms 38d and 38a may removably attach the components.

Figure 3:
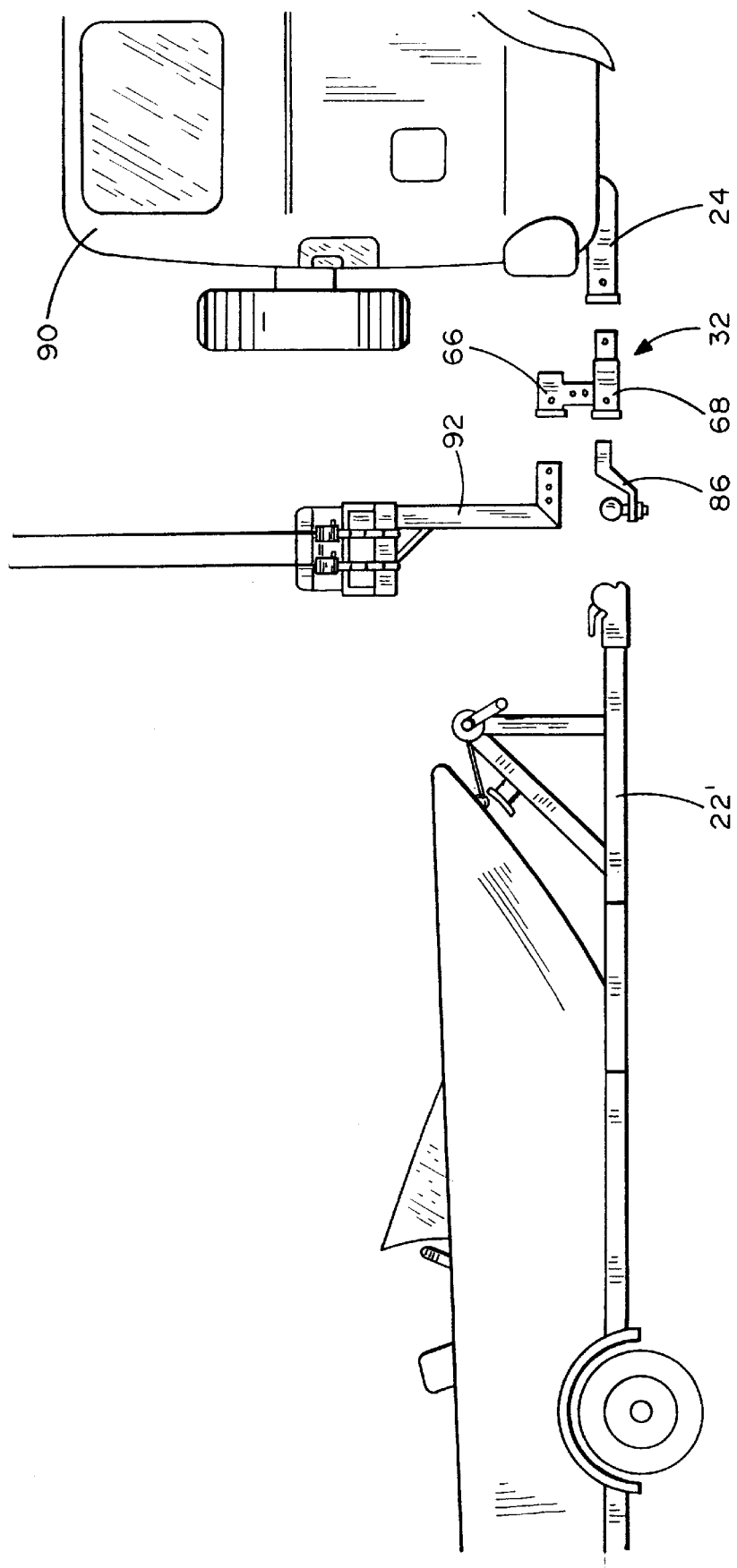
FIG. 3 is a side elevational view of another embodiment of the present invention, similar to FIG. 2.
Figure 4:
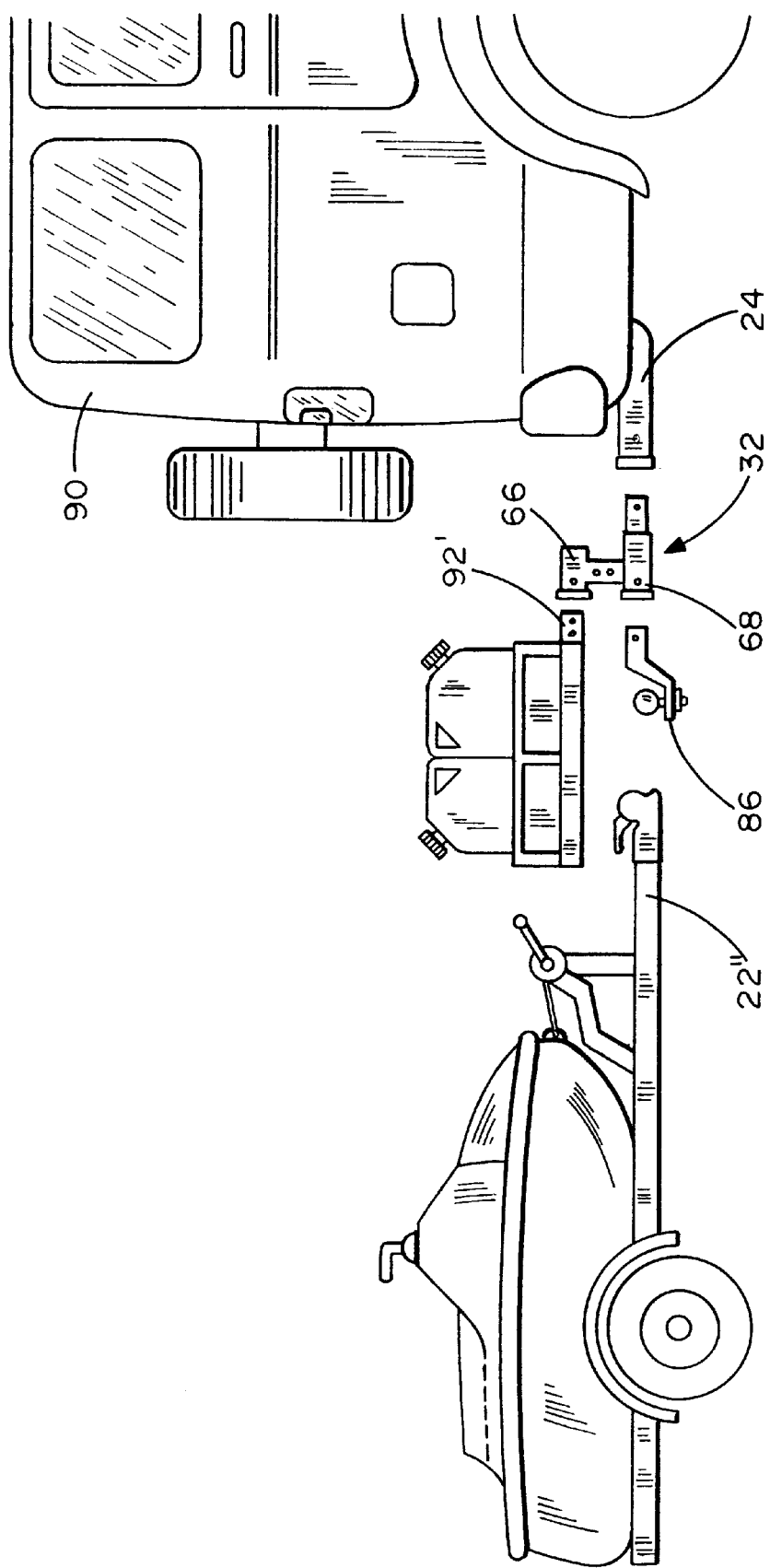
FIG. 4 is a side elevational view of yet another embodiment of the present invention, similar to FIG. 2.
Figure 5:
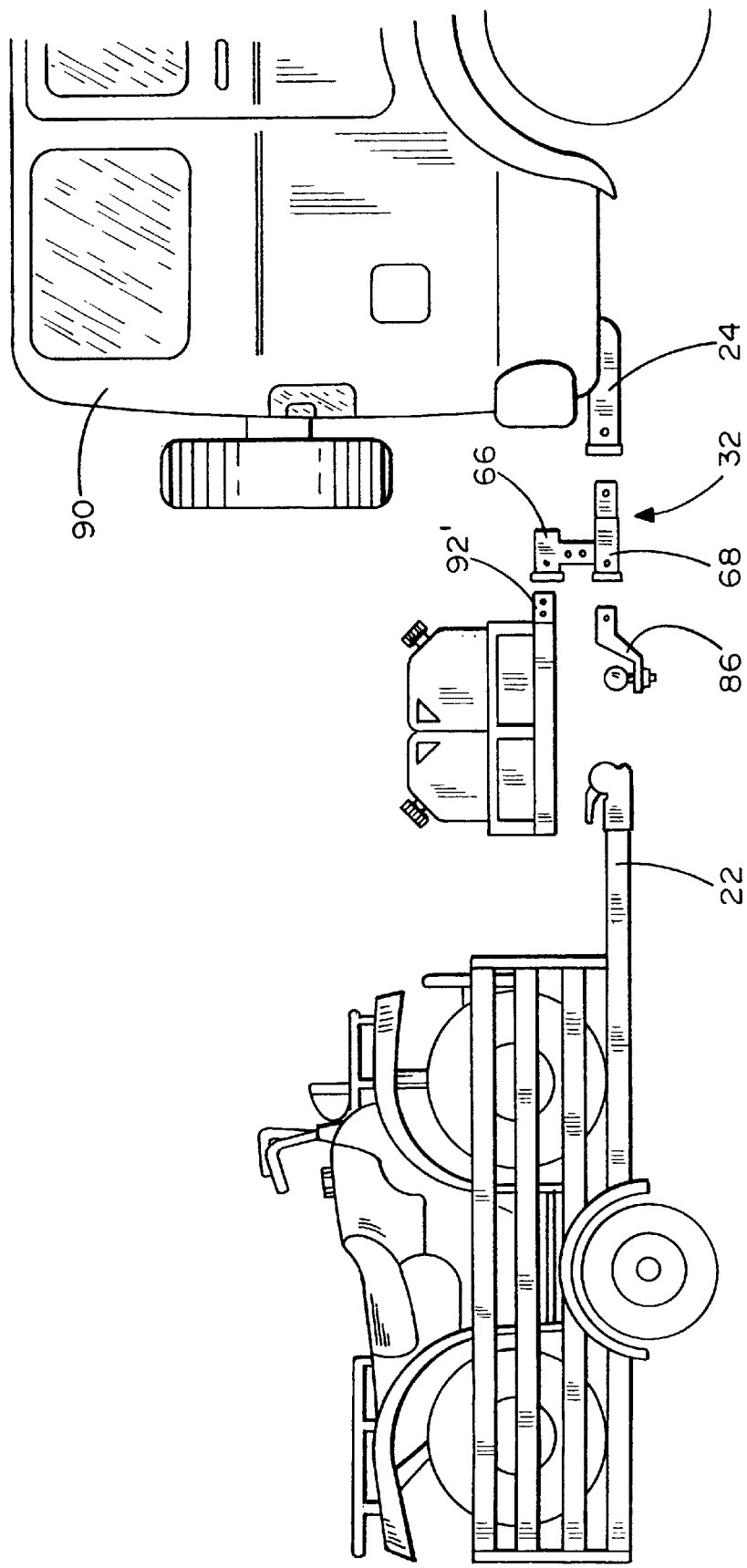
FIG. 5 is a side elevational view of yet another embodiment of the present invention, similar to FIG. 2.
Figure 6:
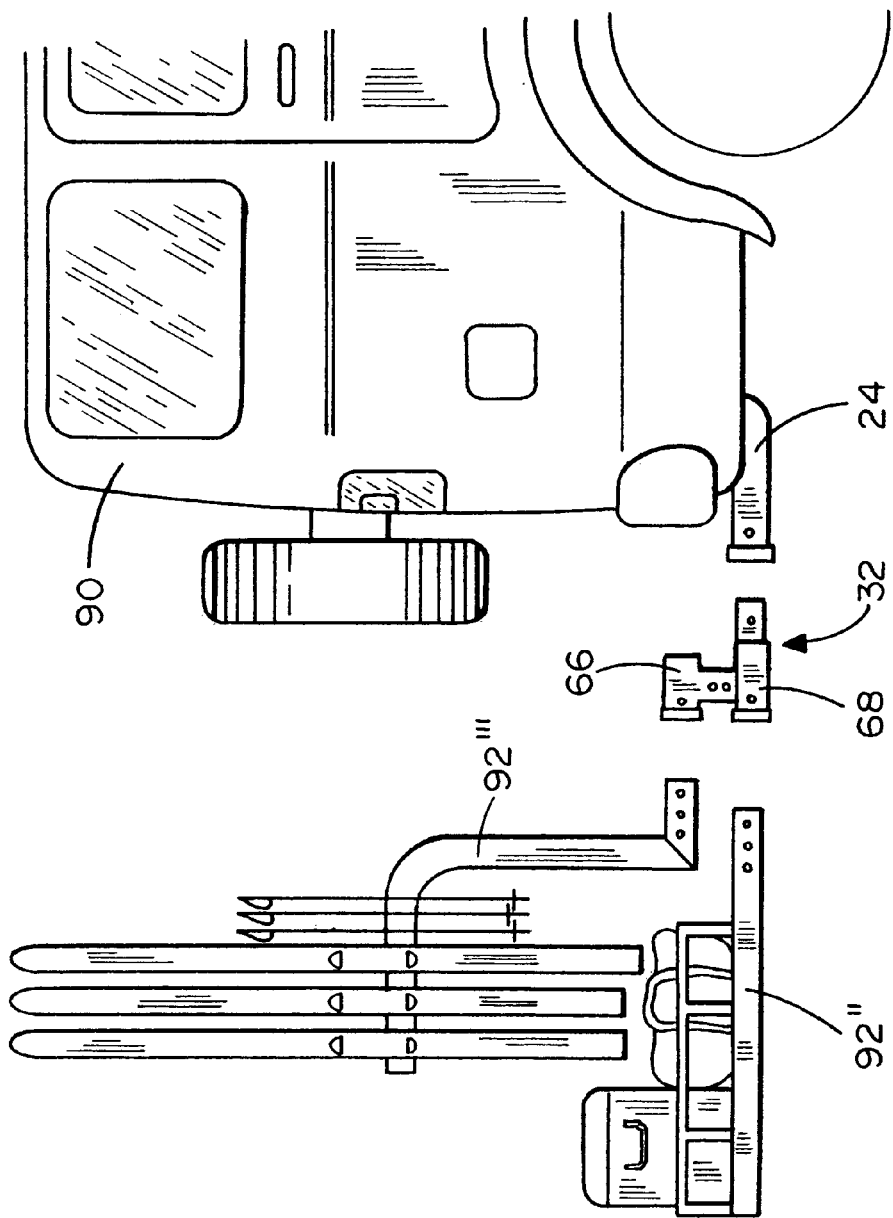
FIG. 6 is a side elevational view of yet another embodiment of the present invention, similar to FIG. 2.
Figure 7:
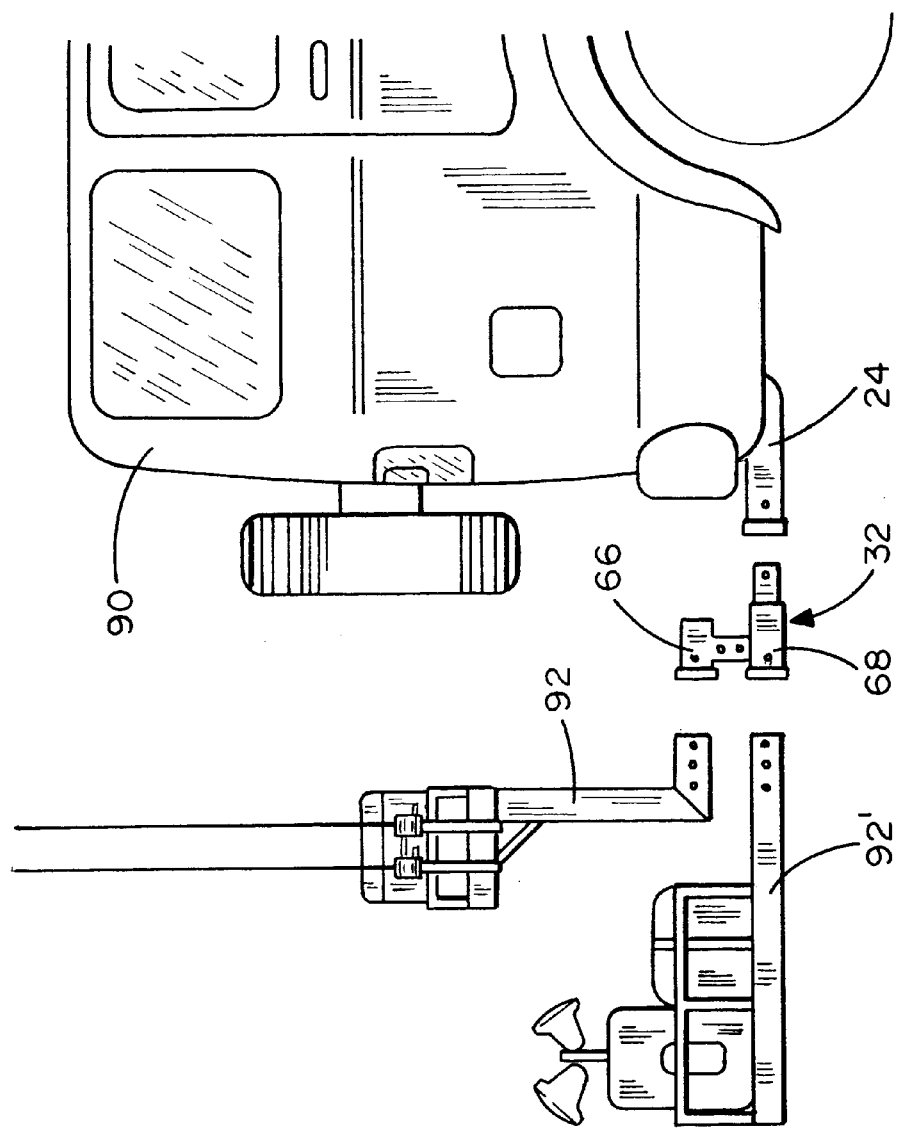
FIG. 7 is a side elevational view of yet another embodiment of the present invention, similar to FIG. 2.

Dual draw bar 32 advantageously allows first receiver 66 to be utilized with one draw bar accessory while simultaneously allowing second receiver 68 to be utilized by another draw bar assembly, all the while being removably attached to a hitch receiver, such as draw bar-type hitch receiver 24. For example, referring to FIG. 2, dual draw bar 32 allows vehicle 20 to not only tow trailer 22 through trailer ball attachment 86 removably attached to second receiver 68, but also to use hoist 10 on first receiver 66 without separately disconnecting the trailer and setting up the hoist. Additionally, a hitch step 88 is attached to first receiver 66, such as with u-bolts or by welding, to provide a platform to stand upon to reach onto the roof of a vehicle or to more easily reach or step inside the back of the vehicle. Referring to FIGS. 3–5, dual draw bar 32 allows vehicle 90 to not only tow a trailer 22, 22', 22" on second receiver 68, but also carry any other items such as gas, oil or equipment used with items being towed on the trailer, on a receiver hitch basket 92, 92' type of carrier on first receiver 66. Referring to FIGS. 6–7, dual draw bar 32 allows vehicle 90 to use a receiver hitch basket 92', 92" on second receiver 68 while using another receiver hitch basket 92 and a bike/ski carrier 92'" on first receiver 66. Other combinations will be obvious to one skilled in the art, such as allowing the vehicle to tow a camper and carry a receiver basket type carrier for the generator, gas grill, etc., or allowing the vehicle to tow a camper and use a bike/ski carrier. Further, dual draw bar 32 may be used as an extension to the draw bar-type hitch receiver to allow a sharper turning radius while towing a trailer, especially on vehicles with a spare tire mounted on the rear door. By allowing a sharper turning radius, dual draw bar 32 reduces the probability of jackknifing the trailer while in reverse. Therefore, the use of dual draw bar 32 increases the capability of a typical draw bar-type hitch receiver.

Figure 8:
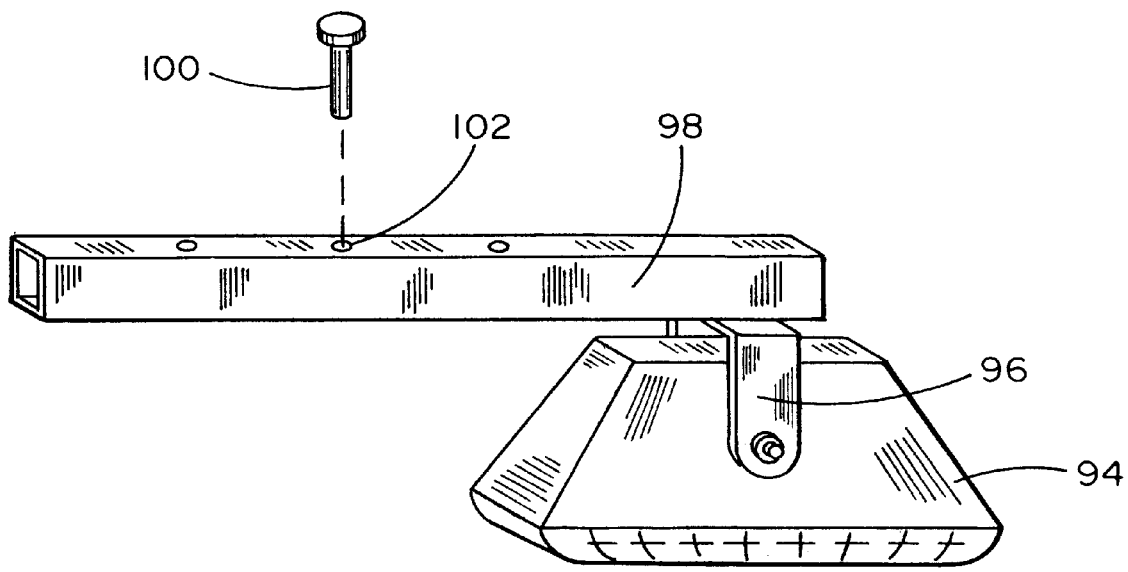
FIG. 8 is perspective view of a light source assembly for use with the hoist of the present invention.

Referring to FIGS. 2 and 8, hoist 10 may further comprise a removably attachable light source 94 for illuminating the area near the hoist. Light source 94 may be energized through an electric cord that connects to the trailer lights of vehicle 20. Alternatively, light source 94 may be battery-operated. Light source 94 is preferably removably attached to boom 14 through hinge 96 and mounting bracket 98 that is secured to boom arm 50 with a securing device 100, such as a bolt, pin, latching pin, etc., disposed through an aperture 102 As one skilled in that art will realize, however, numerous configurations may be utilized to attach light source 94 to hoist 10, and the light source may be attached to portions of the hoist other than the boom arm. Light source 94 advantageously is adjustable, such that the light may be directed in any direction. Light source 94 thereby improves the safety of utilizing hoist 10, especially when dressing and cleaning game animal 12 with sharp dressing objects during dusk or at night. Thus, light source 94 advantageously illuminates the area near hoist 10, or game animal 12 or some other load attached to the hoist, thereby improving the safety of the hoist.

In operation, one embodiment of the present invention is assembled starting with dual draw bar 32 being inserted into draw bar-type hitch receiver 24 mounted on a vehicle and locked into place with securing mechanism 38*d*. As stated above, the relative distance between first receiver 66 and second receiver 68 may be adjusted with securing mechanism 38*c*. Draw bar portion 28 of base support member 26 is then inserted within first receiver section 70 and locked in place with securing mechanism 38*d*. Second support member 42 is then inserted into first support member 40 using securing mechanism 38*b* for adjustment to lock the two together at a desired length l. Then, boom column 48 of boom 14 is slid onto support column 16 at the top of second support member 42 to form a boom assembly. The boom assembly is lifted to a vertical position and inserted over base column 30 of base support member 26. Then, lift device 64 such as a gambrel is then attached to game animal 12 to be hoisted. Rope/cable 56 from hoist 10 is then connected to lifting device 64. Therefore, game animal 12 is lifted with the assistance of either a multiple block and tackle assembly or winch 54. After cleaning and dressing, game animal 12 may be moved onto an object adjacent to hoist 10 with boom 14 being swiveled to the desired position. Hoist 10 may then be disassembled in a reverse fashion from the above assembly instructions, and compactly stowed for future use.

Thus, the present invention allows the hunter to clean and dress game anywhere they wish, with the assistance of a vehicle with a class three receiver hitch. This hoist also assists with the loading of very large game onto the vehicle to which the hoist is mounted, or a trailer for transportation, or the butcher table or any place that might be difficult to lift large game.

Although the invention has been described with reference to these preferred embodiments, other embodiments can achieve the same results. Variations and modifications of the present invention will be apparent to one skilled in the art. For example, besides using the male/female-type adapters described above for removably interconnecting the various components of the hoist, other known connection methods that allow adjustment between the components may be utilized. Further, the tubular shape of the components may be varied to accomplish the same result. Thus, the present disclosure is intended to cover all such modifications and equivalents.

What is claimed is:

1. A hoist for removable attachment to a draw bar-type hitch receiver, comprising:

a dual draw bar comprising a first receiver and a second receiver at one end and a draw bar adapter at an opposing end, said first receiver and said second receiver each comprising a receiver section for receiving a draw bar, and said draw bar adapter sized for positioning within said draw bar-type hitch receiver;

a base support member positionable within either one of said first receiver and said second receiver;

a support column removably attachable to said base support member; and a boom removably attachable to said support column, wherein said boom is rotatable relative to said base support member and wherein a height from said base support member to said boom is adjustable.

2. The hoist of claim 1, wherein said first receiver and said second receiver are adjustably attached to operatively provide an adjustable distance between said first receiver and said second receiver.

3. The hoist of claim 1, further comprising a first mating section extending from said first receiver and a second mating section extending from said second receiver, and wherein said first mating section and said second mating section are adjustably attached to operatively provide an adjustable distance between said first receiver and said second receiver.

4. The hoist of claim 1, wherein said support column is rotatable relative to said base support member.

5. The hoist of claim 1, wherein said support column is horizontally rotatable relative to said base support member.

6. The hoist of claim 1, wherein said support column has an adjustable length.

7. The hoist of claim 1, wherein said support column further comprises a first support member adjustable relative to a second support member for providing an adjustable length of said support column.

8. The hoist of claim 7, wherein said support column is horizontally rotatable relative to said base support member.

9. The hoist of claim 1, wherein said boom is horizontally rotatable relative to said base support member.

10. A dual draw bar receiver assembly for use with a draw bar-type hitch receiver, comprising:

a first receiver having a first receiver section, a first mating section and a draw bar adapter, said first receiver section for receiving a first draw bar, said draw bar adapter for removable attachment with said draw bar-type hitch receiver;

a second receiver having a second receiver section and a second mating section, said second receiver section for receiving a second draw bar; and wherein said first mating section and said second mating section are attached to each other to operatively provide an adjustable distance between said first receiver and said second receiver.

11. A dual draw bar receiver assembly as recited in claim 10, wherein said first mating section has an external cross-sectional dimension smaller than an internal cross-sectional dimension of said second mating section.

* * * * *